March 16, 1926.  1,577,229
V. J. HADDAWAY
COMBINATION VALVE FOR REFRIGERATION AND AIR COMPRESSORS
Filed May 13, 1925  2 Sheets-Sheet 1

Inventor:
Vaden J. Haddaway,
Att'y.

March 16, 1926. 1,577,229
V. J. HADDAWAY
COMBINATION VALVE FOR REFRIGERATION AND AIR COMPRESSORS
Filed May 13, 1925  2 Sheets-Sheet 2

Inventor:
Vaden J. Haddaway,

Atty.

Patented Mar. 16, 1926.

1,577,229

UNITED STATES PATENT OFFICE.

VADEN J. HADDAWAY, OF WILMINGTON, DELAWARE.

COMBINATION VALVE FOR REFRIGERATION AND AIR COMPRESSORS.

Application filed May 13, 1925. Serial No. 30,070.

*To all whom it may concern:*

Be it known that I, VADEN J. HADDAWAY, a citizen of the United States, residing at Wilmington, in the county of New Castle and State of Delaware, have invented certain new and useful Improvements in Combination Valves for Refrigeration and Air Compressors, of which the following is a specification.

My said invention relates to a combination valve for refrigerating machines, air compressors and the like and it is an object thereof to provide a device of this character in which the inlet and outlet passages shall be controlled by a single valve of relatively simple construction.

Another object of the invention is to provide a device of the character described in which all parts of the valve may be removed or replaced from one end of the casing without disturbing other parts.

Another object of the device is to provide a screen in connection with the valve.

Figure 1:
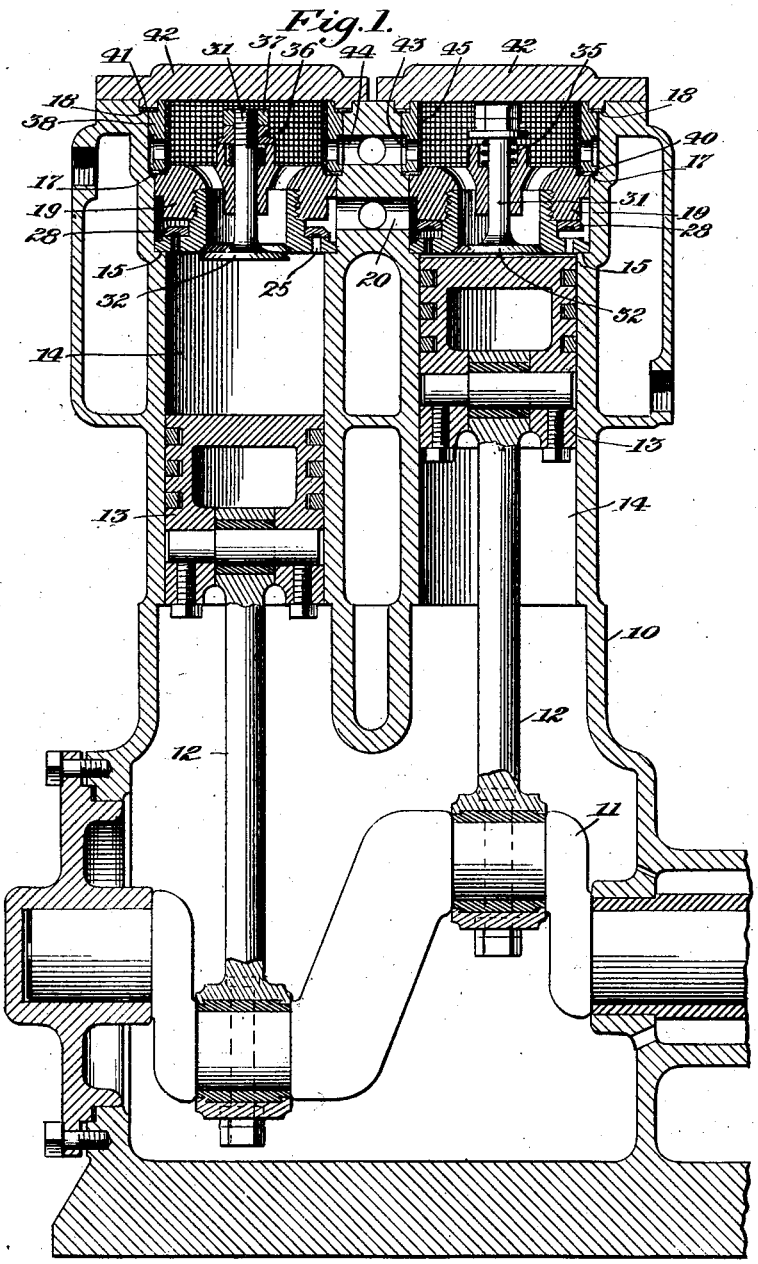
Figure 2:
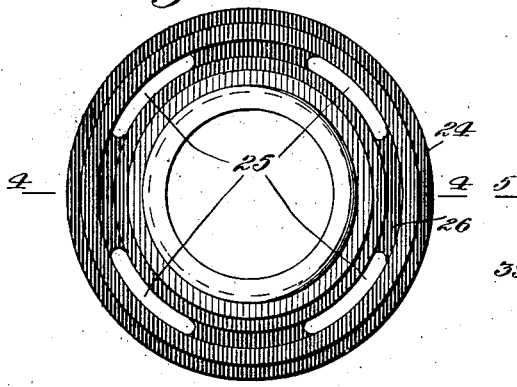
Figure 3:
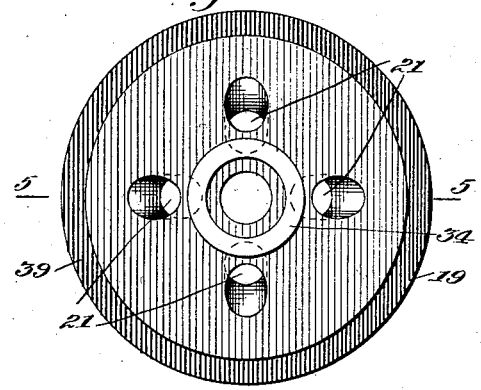
Figure 4:
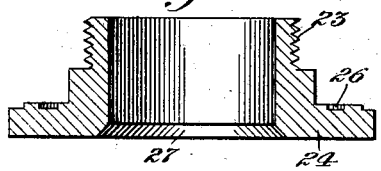
Figure 5:
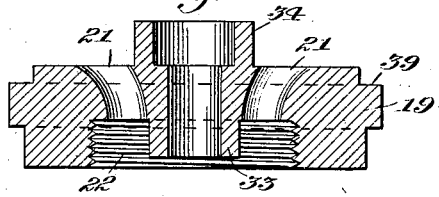
Figure 6:
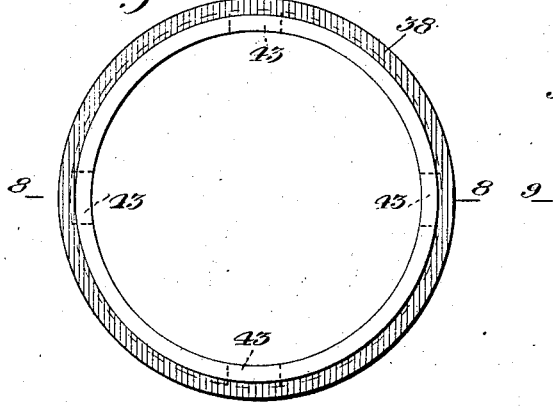
Figure 7:
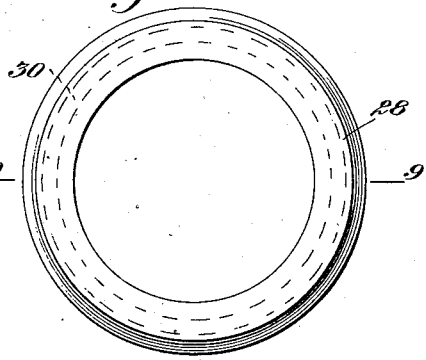
Figure 8:
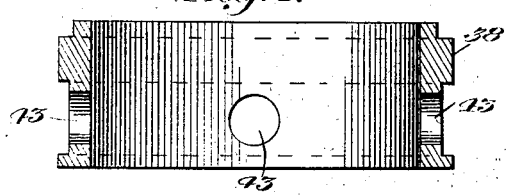
Figure 9:
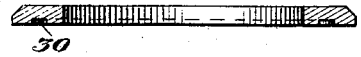

Referring to the accompanying drawings, which are made a part hereof and on which similar reference characters indicate similar parts, Figure 1 is a longitudinal section of a part of a compressor embodying the device of my invention, Figure 2, a bottom plan of an element shown in Fig. 1, Figure 3, a top plan of another element shown in said figure, Figure 4, a vertical section on an enlarged scale of a part shown in Fig. 1, Figure 5, a similar section of another part of the device, Figure 6, a plan of a ring shown in Fig. 1, Figure 7, a plan of a movable valve shown in Fig. 1, Figure 8, a section on line 8—8 of Fig. 6, and Figure 9, a section on line 9—9 of Fig. 7.

In the drawings reference character 10 indicates the closed frame or casing of a compressor or other device having bearings in which a crankshaft 11 is supported for rotation. A pair of connecting rods 12 are driven by the crankshaft, said connecting rods having pistons 13 supported thereon at their upper ends which pistons fit closely in cylinders 14 formed integral with the outer casing of the machine all as is customary in the art.

At the upper end of each cylinder I have provided a shoulder 15 on which is supported a partition separating the cylinder from the upper chamber of a valve casing which is formed in the casing 10 of the machine frame as an extension of the cylinder 14. The shoulder 15 is separated from another shoulder at 17 by a cylindrical wall and another cylindrical wall above the shoulder 17 separates said shoulder from a shoulder at 18, each of said cylindrical walls being of greater diameter than the preceding one whereby all of the parts supported on the different shoulders may be removed through the open upper end of the chamber formed by a cylinder 14 and its valve casing.

The partition of the valve comprises a body member 19 fitting inside the smaller wall of the valve casing and having a reduced portion above the T-shaped outlet opening 20 in the frame of the machine which outlet opening is here shown as being formed in that part of the frame separating two valve casings whereby a single outlet opening serves both cylinders. The body 19 has a plurality of passages 21 (Figs. 3 and 5) extending downwardly therethrough and converging at their lower ends into a single passage.

The interior of the body is threaded as shown at 22 (Fig. 5) to receive the reduced threaded portion 23 of a member 24 (Figs. 2 and 4) forming a part of the partition which member has a series of passages 25 through an outwardly extending flange, said passages leading from the cylinder 21 to the outlet port 20. The passages 25 are connected by an annular groove 26 in the upper face of the outwardly extending flange of member 24 which flange rests on the shoulder 15, and said groove connects all of said passages 25. A flaring valve seat is provided at 27 at the lower end of member 24. A gravity-operated valve member 28 rests normally on the upper face of the member 24 said valve closing the passages 25. This valve has a groove at 30 on its underside registering with the groove at 26 providing for ready separation of the valve from the flange on which it is normally seated, when the piston 13 moves upward.

The body member 19 of the partition has a central passage for the stem 31 of a valve 32 having a frusto-conical part fitting the flaring seat 27. A downward extension is provided at 33 on the body for guiding the valve stem and an upward extension at 34 with a larger inner diameter than the stem provides a seat for a spring 35 bearing against a nut 36 on the valve stem which nut is secured in adjusted position by a locknut 37. It will be seen that the spring normally holds the valve closed in the position indicated at the right-hand side of Fig. 1.

A ring 38 (Figs. 6 and 8) rests on the shoulder 17, the thickness of the ring being such that it extends over the shoulder 39 on the body 19 to hold the partition down on the shoulder 15. Preferably a packing ring 40 is interposed between the ring 38 and the parts on which it rests. At its upper end the ring is provided with a reduced portion forming a shoulder on a level with the shoulder 18. A packing ring 41 rests on these shoulders and is held in place by the cover 42 of the valve casing. The ring 38 is provided with a plurality of ports 43 communicating with an outer reduced part on the ring forming an annular passage thereabout which passage in turn communicates with an inlet passage 44 formed in the part of the machine casing between two of the cylinders, as shown in Fig. 1. Within the ring a cylindrical screen is indicated at 45 which screen serves to remove foreign matter from the incoming liquid or gas according to the use of the device. Preferably this screen extends from the cap 42 down to the shoulder 39 on the body 19.

The operation of the device is believed to be obvious from the foregoing description but may be briefly summarized as follows: When the piston 13 descends it provides a suction on the valve 32 drawing it down to the position indicated at the left-hand side of Fig. 1 against the tension of spring 35 and opening the passage through the partition thereby admitting fluid from the passage 44 to the cylinder. After the piston reaches the lower part of its stroke it rises and the spring 35 immediately closes the valve 32, being assisted by the pressure of the fluid from the rising piston. The pressure of such fluid now lifts the valve 28 and the fluid passes out through the passages 25 and 20.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent is:

1. The combination of a valve casing having axially spaced shoulders separated by cylindrical walls of progressively increasing diameter, a partition supported by the inner shoulder, a ring on the next shoulder resting on the partition, and a cover bearing on the outermost shoulder, substantially as set forth.

2. A valve casing as in claim 1, with inlet and outlet passages through the partition, and valves adapted to alternately close, substantially as set forth.

3. A valve casing as in claim 1, with means on said cover for holding said ring and said partition in place, substantially as set forth.

4. A valve casing as in claim 1, with inlet passages through the ring and the partition, and a cylindrical screen fitting in said ring to screen fluid entering the valve casing, substantially as set forth.

5. In a compressor having a cylinder and a piston, a combination valve including a casing, an inlet passage in said casing, a transverse partition in said casing, passages leading downward through the partition to the cylinder of the compressor, means normally closing said passages, an outlet port in the casing, passages through the partition leading to said outlet port, and means normally closing said passages said last-named means comprising an annular valve resting on an external flange of said partition and closing passages in the partition leading toward said outlet port said valve having an annular groove in its under face connecting said passages, substantially as set forth.

6. In a compressor having a cylinder and a piston, a combination valve including a casing, an inlet passage in said casing, a transverse partition in said casing, passages leading downward through the partition to the cylinder of the compressor, means normally closing said passages, an outlet port in the casing, passages through the partition leading to said outlet port, and means normally closing said passages said last-named means comprising an annular valve resting on an external flange of said partition and closing passages in the partition leading toward said outlet port, said valve having an annular groove in its under face connecting said passages, and said flange having an annular groove registering with that in the valve, substantially as set forth.

7. The combination in a valve casing of axially spaced shoulders separated by cylindrical walls of progressively increasing diameter, a valve body disposed within the smallest wall against the shoulder at the smallest end of the casing and terminating adjacent the shoulder at the outer end of said smallest wall, a ring on the next shoulder extending over and resting on said body, said ring having a plurality of openings therethrough connected by an exterior channel, a screen within said ring, and a removable end cover for said casing resting on the outer shoulder and on the said ring for holding the parts in place, substantally as set forth.

In witness whereof, I have hereunto set my hand and seal at Wilmington, Delaware, this sixth day of May, A. D. nineteen hundred and twenty-five.

VADEN J. HADDAWAY. [L. s.]